United States Patent
Hawthorn et al.

(10) Patent No.: US 6,942,242 B2
(45) Date of Patent: Sep. 13, 2005

(54) BIASING DEPLOYMENT FLAP AND INFLATABLE CUSHION COVER

(75) Inventors: Laura A. Hawthorn, Tipp City, OH (US); Stephanie Dunkle, Springboro, OH (US); Richard J. Gustke, Centerville, OH (US); Brian T. Strong, Tipp City, OH (US); Mark T. Winters, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 234 days.

(21) Appl. No.: 10/412,170

(22) Filed: Apr. 11, 2003

(65) Prior Publication Data

US 2003/0234520 A1 Dec. 25, 2003

Related U.S. Application Data (60) Provisional application No. 60/391,302, filed on Jun. 25, 2002.

(51) Int. Cl.[7] .............................................. B60R 21/16
(52) U.S. Cl. ................. 280/728.2; 280/732; 280/743.1
(58) Field of Search ........................... 280/728.2, 743.1, 280/732

(56) References Cited

U.S. PATENT DOCUMENTS

| 5,348,343 | A | | 9/1994 | Hawthorn | 280/730 |
|---|---|---|---|---|---|
| 5,452,913 | A | * | 9/1995 | Hansen et al. | 280/732 |
| 5,498,023 | A | * | 3/1996 | Adams et al. | 280/728.2 |
| 5,498,031 | A | * | 3/1996 | Kosugi | 280/743.1 |
| 5,603,523 | A | * | 2/1997 | Rhule et al. | 280/728.2 |
| 5,615,910 | A | * | 4/1997 | Margetak et al. | 280/728.2 |
| 5,823,566 | A | * | 10/1998 | Manire | 280/743.1 |
| 6,186,534 | B1 | * | 2/2001 | Heinz | 280/728.2 |
| 6,206,409 | B1 | * | 3/2001 | Kato et al. | 280/728.2 |
| 6,213,500 | B1 | * | 4/2001 | Jost et al. | 280/743.1 |
| 6,237,949 | B1 | * | 5/2001 | Nozumi et al. | 280/743.1 |
| 6,499,765 | B2 | | 12/2002 | Hawthorn et al. | |

* cited by examiner

Primary Examiner—Paul N. Dickson
Assistant Examiner—Joselynn Y. Sliteris
(74) Attorney, Agent, or Firm—Scott A. McBain (57) ABSTRACT

A deployment flap for use with an inflatable cushion is provided. The deployment flap includes a fabric or other flexible, foldable material; a plurality of securement tabs each having a weakened area; and a cover area defined in the fabric. The fabric is connectable to the inflatable cushion to cause the inflatable cushion to be biased in a selected direction upon inflation of the inflatable cushion. The cover area covers the inflatable cushion prior to inflation of the inflatable cushion. The securement tabs secure the fabric to a retainer. The weakened area releases the fabric from the retainer upon the inflation of the inflatable cushion.

20 Claims, 6 Drawing Sheets

BIASING DEPLOYMENT FLAP AND INFLATABLE CUSHION COVER

CROSS REFERENCE TO RELATED APPLICATIONS

This application claims the benefit of U.S. Provisional Application 60/391,302 filed Jun. 25, 2002, the contents of which are incorporated herein by reference thereto.

BACKGROUND OF THE INVENTION

This disclosure relates to vehicle airbags. More, specifically, this disclosure relates to an apparatus and method for biasing the direction of an inflatable cushion during deployment as well as providing a means for covering the inflatable cushion prior to deployment.

Airbags have become common in modern automobiles. An airbag module typically comprises an inflatable cushion disposed within a housing and an inflator in fluid communication with the inflatable cushion wherein the inflator is adapted to provide a quantity of gas for inflating the inflatable cushion. The module is installed in a desired position within the vehicle, such as the steering wheel, the dashboard, the seat, the A-pillar, and other locations within the vehicle. The module is covered with a deployable door configured to protect and/or conceal the inflatable cushion. The inflatable cushion is stored in a folded position within the housing in fluid communication with the inflator to produce an inflation gas. In response to an activation event or occurrence, a sensor provides a signal for activating the inflator. The inflator provides a supply of inflating gas to the cushion to inflate the cushion. The inflation gas causes the cushion to expand and deploy from the housing into the vehicle.

Airbag modules have been designed to provide means for controlling the deployed shape of the inflatable cushion. One such means is provided by commonly owned U.S. Pat. No. 5,348,343, the contents of which are incorporated in their entirety by reference thereto.

SUMMARY

A deployment flap for use with an inflatable cushion is provided. The deployment flap includes a fabric or other flexible, foldable material; a plurality of securement tabs each having a weakened area; and a cover area defined in the fabric. The fabric is connectable to the inflatable cushion to cause the inflatable cushion to be biased in a selected direction upon inflation of the inflatable cushion. The cover area covers the inflatable cushion prior to inflation of the inflatable cushion. The securement tabs secure the fabric to a retainer. The weakened area releases the fabric from the retainer upon the inflation of the inflatable cushion.

An airbag module is provided. The module comprises a housing defining a cavity, an inflator disposed in the cavity, an inflatable cushion stored in a folded position in the cavity, and a deployment flap being secured to a portion of the inflatable cushion. The inflatable cushion is in fluid communication with the inflator such that upon detection of an activation event the inflator provides a quantity of inflation gas to cause the inflatable cushion to inflate. The retainer has studs depending therefrom. The studs secure the inflatable cushion and securement tabs of the deployment flap to the housing such that a cover area of the deployment flap covers the inflatable cushion in the folded position. The securement tabs release the deployment flap from the studs upon inflation of the inflatable cushion. The deployment flap biases the inflatable cushion in a selected direction as the inflatable cushion inflates.

A method of assembling an airbag module is provided. The method comprises folding an inflatable cushion to a desired folded position; securing a deployment flap to a first portion of the inflatable cushion; securing an airbag retainer to a second portion of the inflatable cushion; and securing the deployment flap to the airbag retainer such that a cover area of the deployment flap covers the inflatable cushion in the desired folded position. The deployment flap is unsecured from the airbag retainer upon the inflation of the inflatable cushion. The deployment flap being biases the inflatable cushion in a selected direction upon the inflation of the inflatable cushion.

The above-described and other features are appreciated and understood by those skilled in the art from the following detailed description, drawings, and appended claims.

DESCRIPTION OF THE PREFERRED EMBODIMENTS

Figure 1:
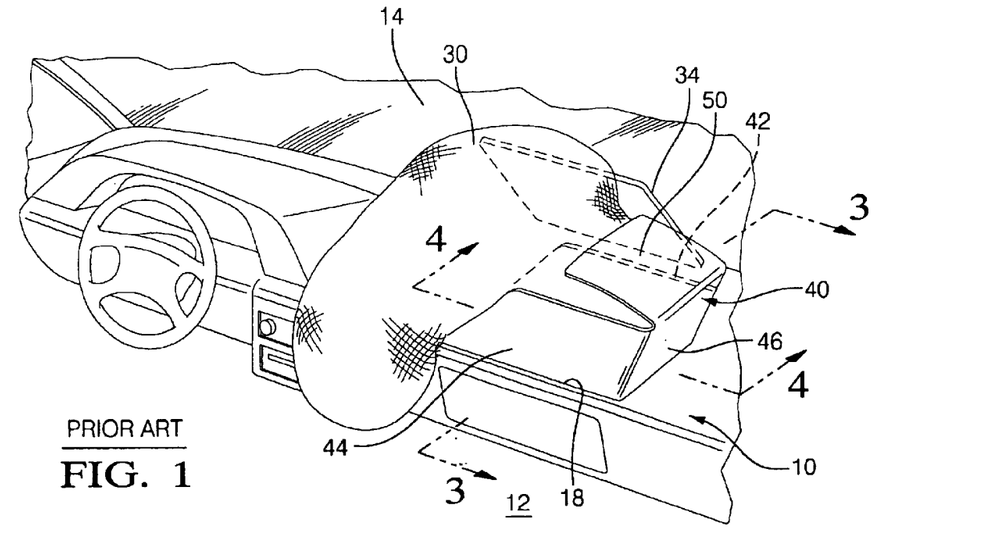
FIG. 1 is a perspective view of a vehicle interior having an instrument panel showing an inflatable cushion biased by a biasing deployment flap.
Figure 2:
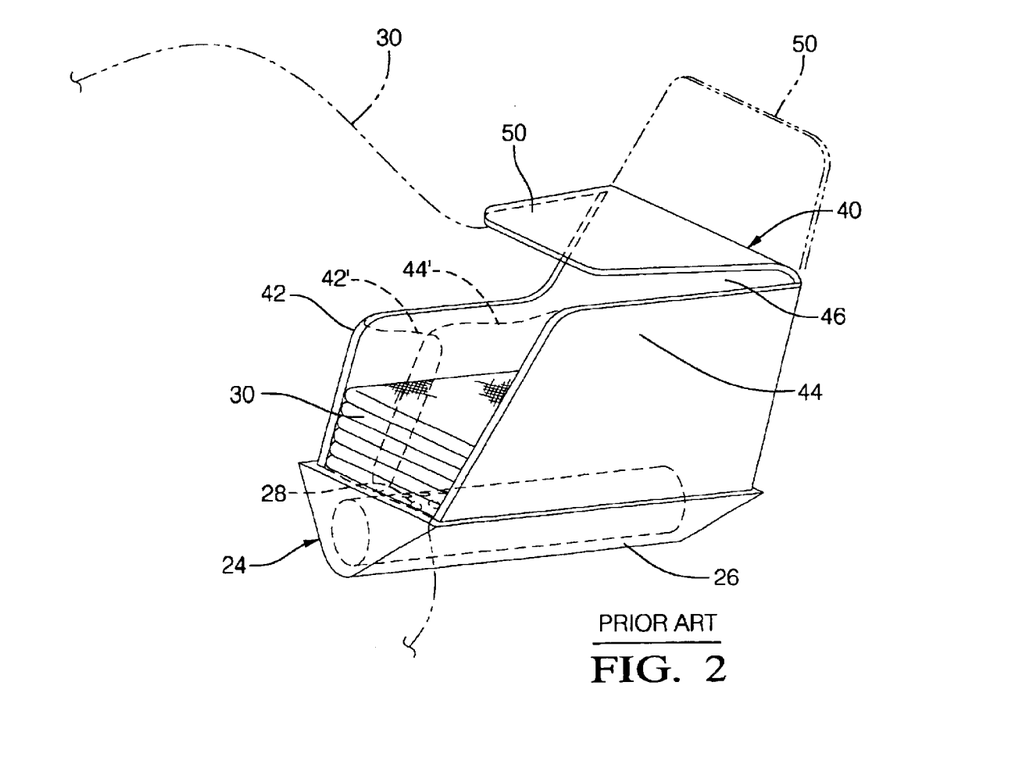
FIG. 2 is a partial perspective view of the biasing flap of FIG. 1.

Referring now to the Figures and in particular to FIGS. 1–2, as well as U.S. Pat. No. 5,348,343, a portion of a motor vehicle having an instrument panel structure 10 is illustrated. The instrument panel structure is located within an occupant seating compartment 12 and is bounded at one end by a windshield 14. An airbag deployment opening 18 is defined in a surface of the instrument panel 10.

An airbag module 24 is mounted in proximate to instrument panel 10 to allow for deployment through opening 18. Module 24 comprises a housing 26 enclosing an inflator 28. An inflatable cushion 30, sewn of suitable fabric material, is attached to housing 26 or inflator 28 and is folded about inflator 28 in an un-inflated state. Cushion 30 is in fluid communication with inflator 28 so as to allow for inflation of cushion 30 by inflator 28.

FIGS. 1–2 show the cushion after it has been inflated by the inflator, which in turn causes the cushion to deploy upwardly through the airbag opening. The opening is normally closed by a door 34, which is attached to the instrument panel in a manner that allows for concealment of the cushion and deployment therethrough. Inflation of inflatable cushion 30 causes door 34 to open.

A deployment flap 40 is configured to control the deployed shape and direction of the inflating cushion 30.

More particularly, deployment flap 40 comprises a fabric or other flexible, foldable material having a first wall 42 and a second wall 44. The first and second walls are connected to each other by a third wall 46. The third wall further comprises an extended portion 50, which extends beyond the extent of the first and second walls so that extended portion 50 is positionable in the positions illustrated in FIGS. 1 and 2. The extended portion is positionable in a first position shown in FIGS. 1–2 and is capable of deploying to a second position shown in phantom in FIG. 2. In FIG. 2. the deployment flap is open at an end opposite the third wall. Alternately, first and second walls 42, 44 may be configured to have extended portions 42' 44', shown by dashed lines in FIG. 2, which extend and cover either a portion of or the entire open end defined opposite to the third wall. Extended portions 42' 44' may be of a sufficient length to overlap each other to cover the open end. Alternatively, each extended portion 42', 44' is of a length to cover only a portion of the open end wherein either all or only a portion of the open end is covered by the extended portions.

The first, second, and third walls are attached to the cushion such that the deployment flap can be folded on top of the folded cushion. In this position and when the cushion is deployed through the opening, the deployment flap is pushed through the opening ahead of the cushion causing walls 42, 44 and 46 to be positioned as shown in FIGS. 1 and 2, thereby defining a deployment chute for directing the deployment of the inflatable cushion.

During some airbag deployments and depending on the location, position, size, use of seat belts or presence of an occupant, extended portion 50 may be held at the first position of FIGS. 1–2. When the extended portion 50 is held at this first position, the deploying cushion 30 is biased towards the open end of the deployment chute as illustrated in FIGS. 1 and 2. However, when the extended portion 50 is not held in the first position and is allowed to deploy into the second position (illustrated in phantom in FIG. 2), the cushion 30 deploys in an unbiased manner.

It should be recognized that the deployment flap configuration illustrated in FIGS. 1 and 2 is provided by way of example only as the biasing of the cushion may be directed in other directions within the vehicle by varying the configuration of the deployment flap. Deployment flap 40 can be configured to bias the cushion in any desired direction, such as but not limited to, outboard of the vehicle, toward windshield 14, toward compartment 12, etc. It will also be appreciated that the extent and duration of the biasing effect may be varied by controlling the relative size and shape of first wall 42, second wall 44, third wall 46, flap portion 50, and combinations of the foregoing.

Figure 3:
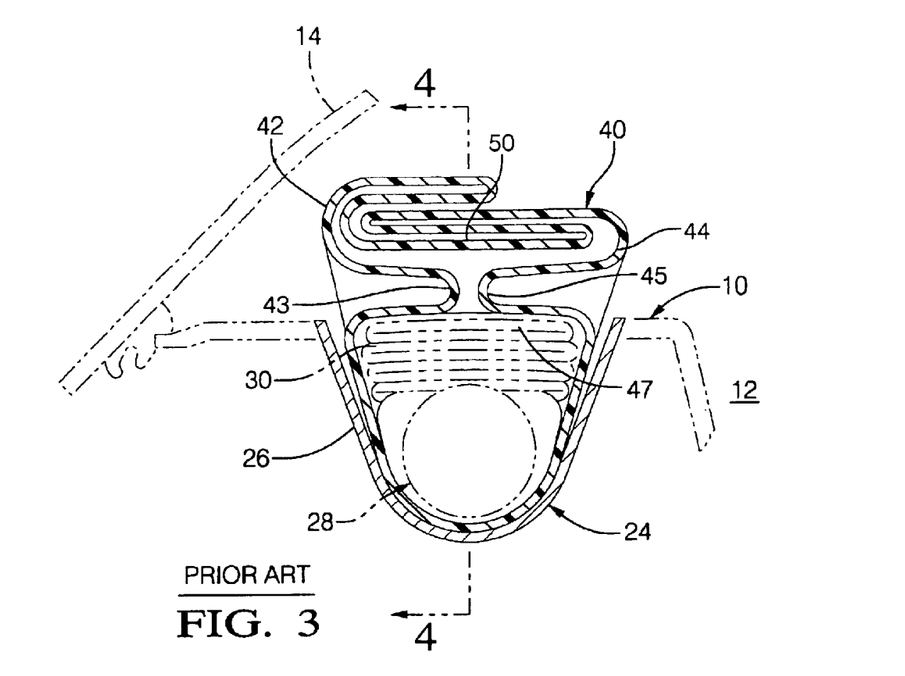
FIG. 3 is a first sectional view of FIG. 1 along lines 3—3.
Figure 4:
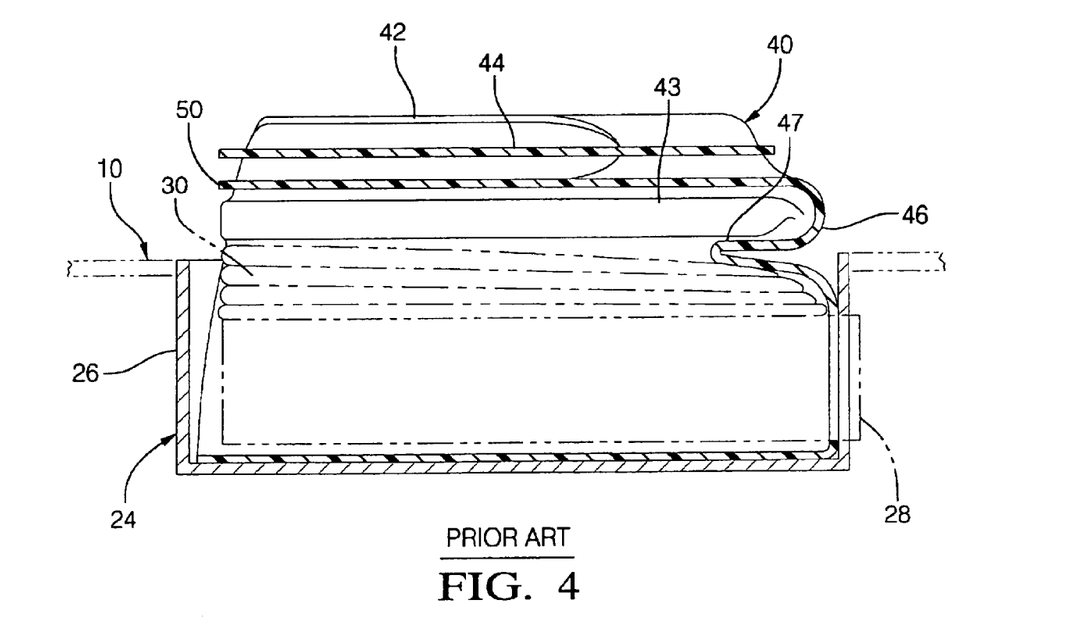
FIG. 4 is a second sectional view of FIG. 1 along lines 4—4.

Referring now to FIGS. 3–4, module 24 is illustrated before the deployment of cushion 30 and deployment flap 40. Deployment flap 40 is folded on top of cushion 30. In particular, FIG. 3 shows that first wall 42 is pleated inwardly at 43 and second wall 44 is pleated inwardly at 45 to meet at the center of airbag module 24. FIG. 4 shows that third wall 46 is also pleated inwardly at 47. This inward pleating of walls 42, 44, and 46 has the effect of shortening the height of the walls. Accordingly, the remaining unpleated height portion of third wall 46 can be folded to lie on top of cushion 30. Then, the remaining height of second wall 44 is laid on top of third wall 46. Finally, the remaining height of first wall 42 is folded down on top of second wall 44.

This particular folding arrangement has been found to provide effective biasing of the cushion, although it is recognized that alternative folding arrangements could be employed and may be desirable and effective depending upon variables such as the size, shape, location and construction of the various elements of the airbag module including but not limited to the deployment flap, the inflatable cushion, the size of the deployment opening, the cover, etc.

It has been determined that the deployment flap can also be configured to act as a cover for the folded cushion. By acting as a cover, the deployment flap provides several benefits. For example, the deployment flap can be used as a protective cover for protecting the inflatable cushion and/or the airbag module before and after its installation into the instrument panel. Additionally, the deployment flap can be used to maintain the cushion in a desired folded state before its deployment.

Referring now FIGS. 5–11, an exemplary embodiment of the present disclosure is illustrated. Here component parts performing similar or analogous functions to those illustrated in FIGS. 1–4 and U.S. Pat. No. 5,348,343 are numbered in multiples of one hundred. It is understood that all of the features of FIGS. 1–4 and U.S. Pat. No. 5,348,343 are incorporated herein with reference to FIGS. 5–11.

Figure 5:
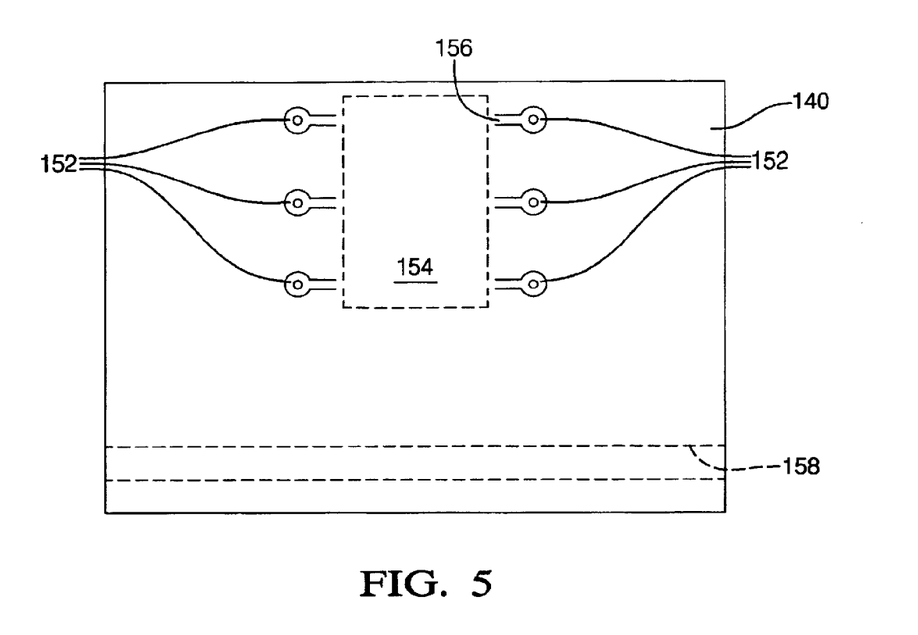
FIG. 5 is a top view of an exemplary embodiment of a deployment flap in an unfolded state.

A combination deployment flap and cover 140 is illustrated in FIG. 5 in an unfolded state. Again, the deployment flap 140 is configured to control the deployed shape of an inflatable cushion 130. More particularly, deployment flap 140 comprises a fabric or other flexible, foldable material. For example, the deployment flap 140 can be formed of woven cotton materials, polymer materials, such as nylon or other suitable materials. When the cushion 130 is deployed through an opening such as opening 18 in FIG. 1, deployment flap 140 is pushed through the opening ahead of the cushion causing the walls of the deployment flap to define a deployment chute. During some airbag deployments, the deployment chute biases the cushion 130 through the deployment chute. However, other airbag deployments modify the deployment chute such that the cushion 130 deploys in an unbiased manner.

The deployment flap 140 comprises a plurality of securement tabs 152 and a cover area 154. In one embodiment securement tabs 152 are cut out of the fabric of deployment flap 140 such that a portion 156 remains secured to the deployment flap while the remainder is used to releasably secure the deployment flap about the inflatable cushion. Alternately, tabs 152 are separate from the deployment flap 140 and are directly secured to the deployment flap at a similar location identified as portion 156 above. In this embodiment tabs 152 comprise a plastic member secured to deployment flap 140.

Deployment flap 140 is secured to the cushion 130 by, for example, one or more sew lines 158 wherein a thread or threads are used to secure flap 140 to cushion 130. Sew lines 158 secure deployment flap 140 and cushion 130 along one or more sides of the cushion (see also FIG. 8).

Figure 6:
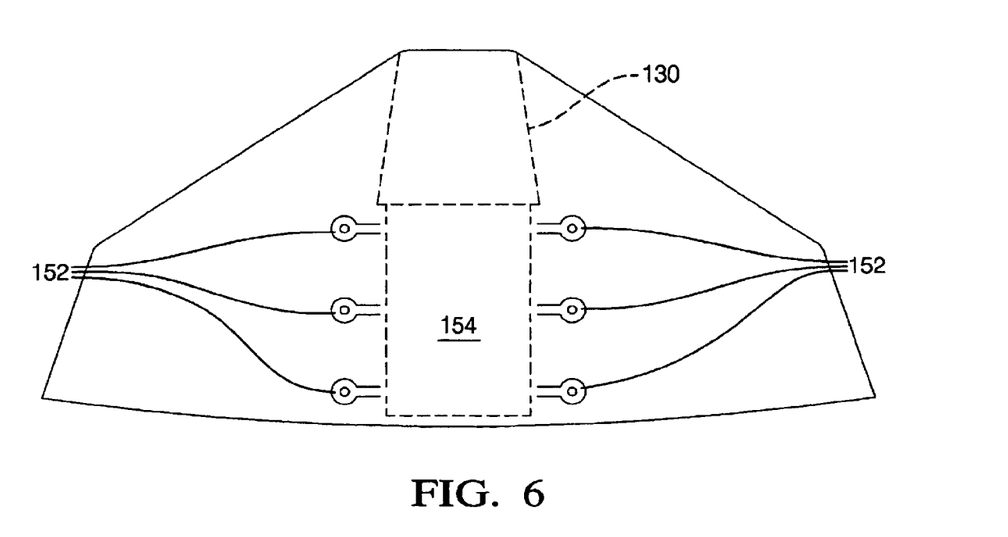
FIG. 6 is perspective view of the deployment flap after being secured to an inflatable cushion.
Figure 7:
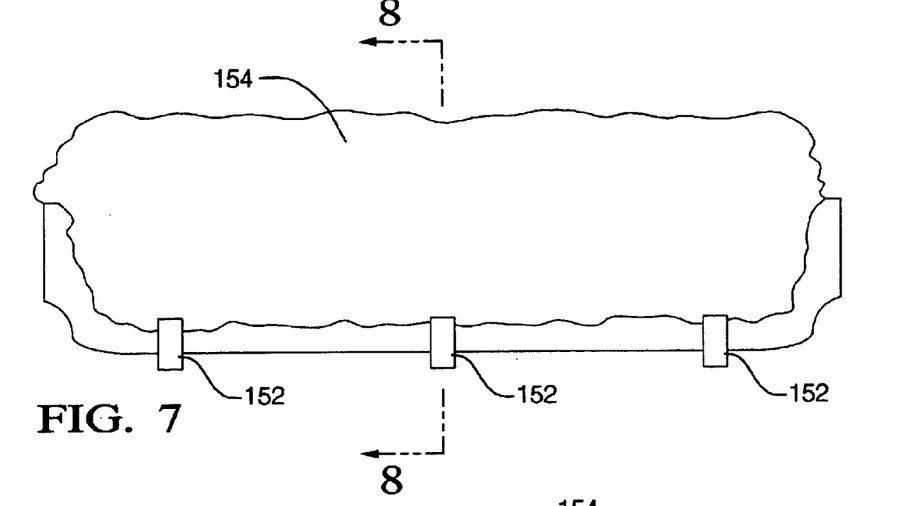
FIG. 7 is a perspective view of the deployment flap in a folded state.

Referring now to FIGS. 6 and 7, flap 140 is illustrated after being secured to inflatable cushion 130. Here, cushion 130 (illustrated in phantom) is beneath the deployment flap 140. After the cushion 130 and deployment flap 140 have been secured to one another through sew lines 158 or other equivalent securement means, the deployment flap is folded such that the cover area 154 covers all or substantially all of the folded cushion (FIG. 7).

Figure 8:
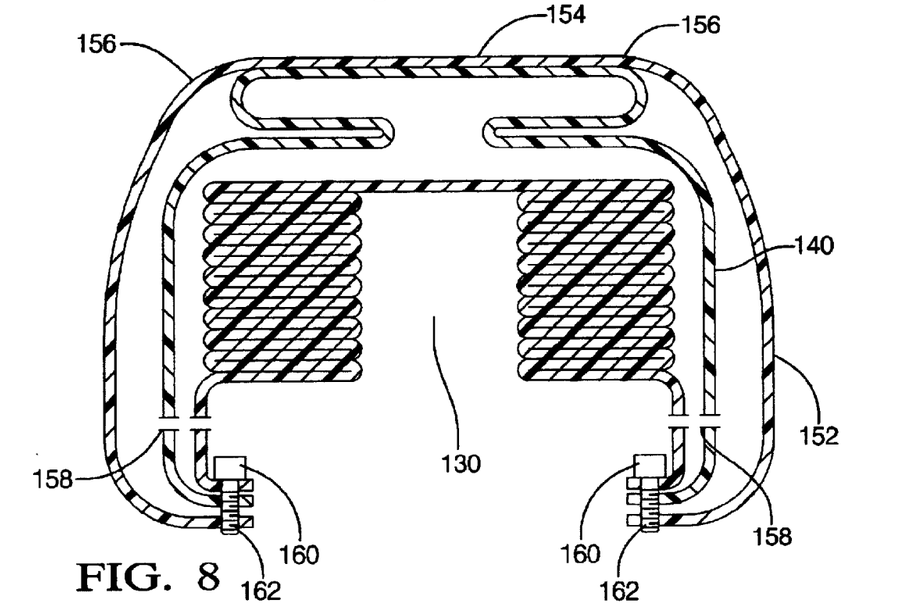
FIG. 8 is a sectional view of FIG. 7 along lines 8—8.

Referring now to FIG. 8, inflatable cushion 130 and securement tabs 152 are secured to an airbag retainer 160. Retainer 160 comprises outwardly depending studs 162. Studs 162 are configured to receive and secure a portion of cushion 130 therein as in known in the related arts. After cushion 130 is placed over studs 162, openings of securement tabs 152 are also placed over studs 162. Tabs 152 are capable of being held in place on the studs by a variety of methods for example, a nut threadably received on the studs, an adhesive, or heat staking the studs to the tabs and/or to the cushion.

Accordingly, retainer 160 is used to secure cushion 130 and deployment flap 140 to the housing of the airbag module.

In this position, cover area 154 covers the folded cushion 130 to protect the cushion and/or module from debris or foreign matter before and after its installation in the instrument panel. Additionally, deployment flap 140 aids in holding cushion 130 in a desired folded state. Thus, the deployment flap 140 can mitigate the settling of cushion 130 to a position other than its desired folded state as may occur as a result of vibration and shocks on the airbag module either prior to its securement within the module or after the securement.

Figure 9:
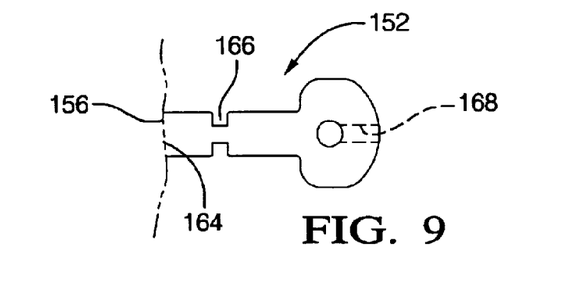
FIG. 9 illustrates alternative embodiments of a securement tab for use with the present disclosure.

Upon deployment of cushion 130, a portion of the tabs 152 is configured to rupture or break such that the cushion and the deployment flap can function as intended. Alternative exemplary embodiments of tabs 152 are illustrated in FIG. 9. For example, and in one alternative embodiment wherein the tabs are cut from the material of the deployment cover each tab 152 has a first weakened area 164 located at portion 156. First weakened area 164 is provided, for example, by perforating the portion of the tab still connected to the material of the deployment cover. Alternately, tab 152 includes a second weakened area 166 in the form of a narrowed section of the tab. The narrowed section is formed by channels or "V" shaped openings configured to promote tearing of the tab when the cushion deploys. In yet another alternative tab 152 includes a third weakened area 168 formed in the section of the tab that is disposed over stud 162. Third weakened area 168 can also be provided, for example, by perforating the tab. Of course, any one of the above alternatives alone or any combination thereof can be provided to ensure that tabs 152 release deployment flap 140 from retainer 160 when cushion 130 is deployed. For example any one of the weakened areas are contemplated for use with the cut out tabs or tabs, which are secured to the deployment cover. In addition, various combinations of the weakened areas may also be used in these tabs.

Figure 10:
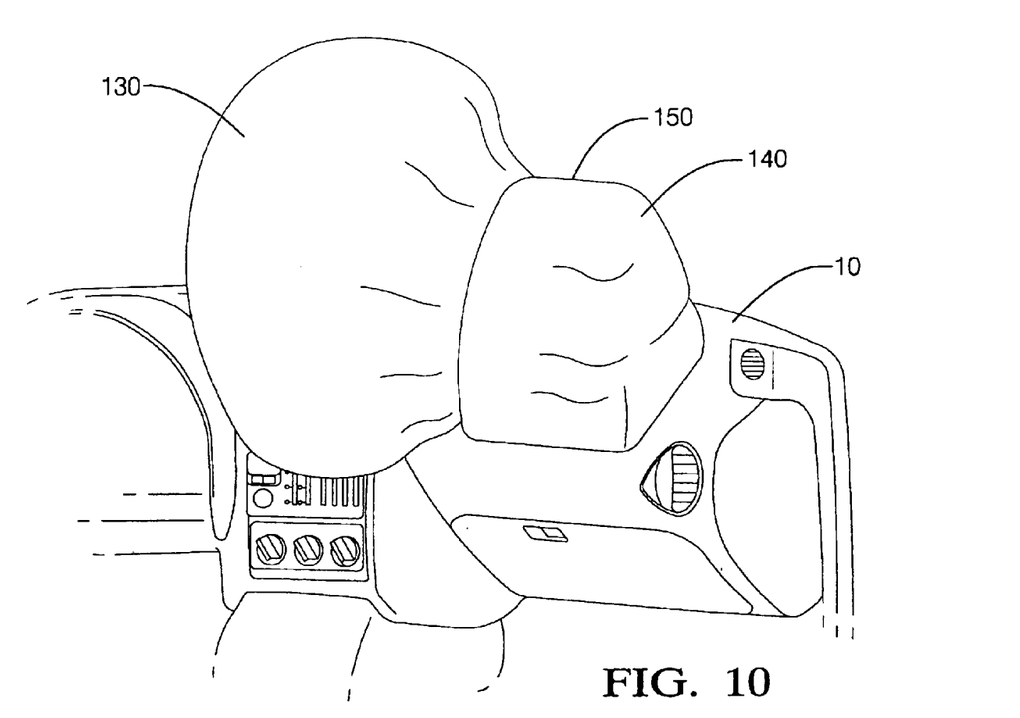
FIGS. 10 and 11 illustrate a biased deployment of an inflatable cushion.
Figure 11:
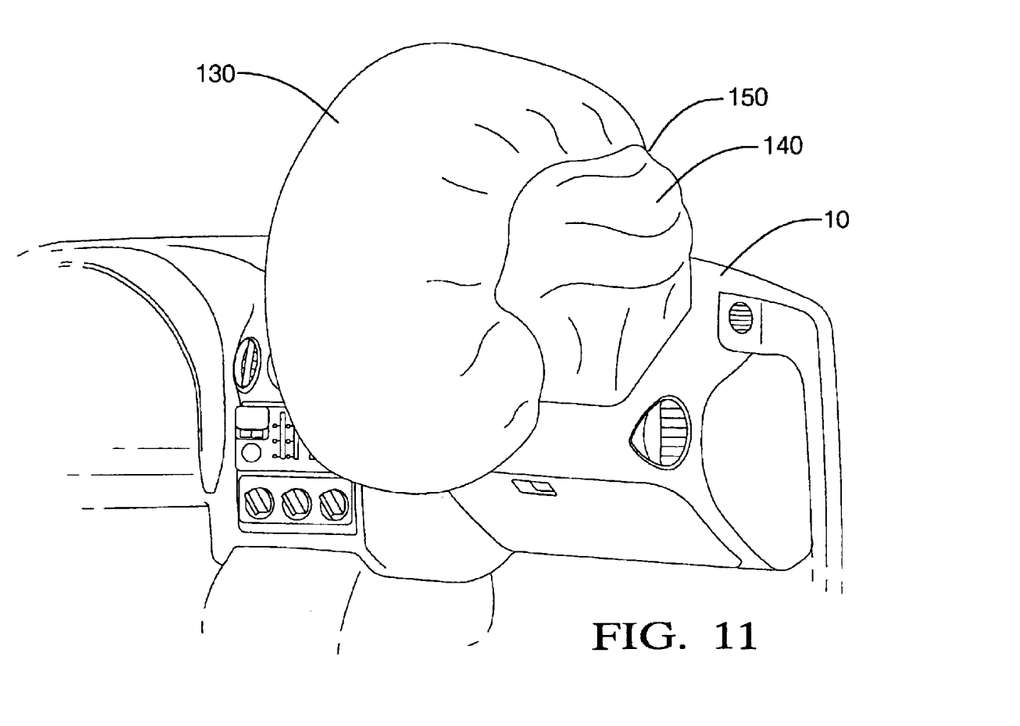
Figure 12:
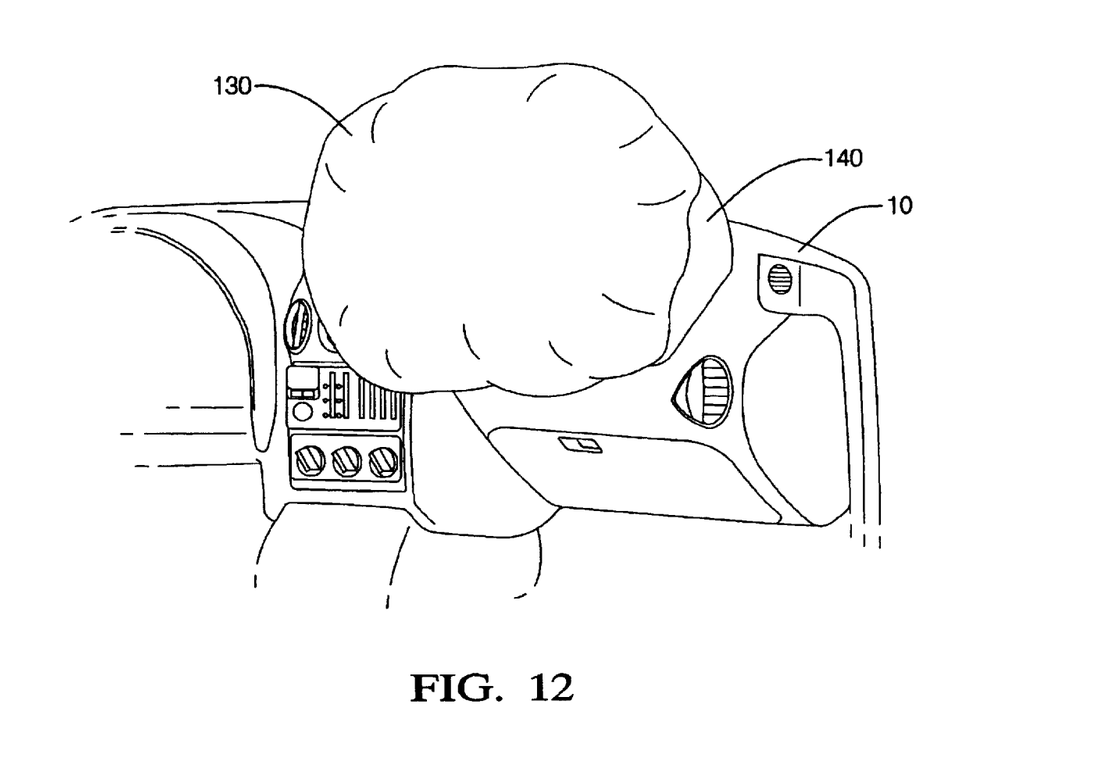
FIG. 12 illustrates and un-biased deployment of an inflatable cushion.

FIGS. 10 and 11 illustrate the biasing of the inflatable cushion when extended portion 150 is held in place while FIG. 12 illustrates the deployment of the inflatable cushion when the extended portion not held in place and is allowed to deploy to the second position.

It should be recognized that the deployment flap and retainer are illustrated by way of example only as including six securement tabs and six studs. Of course, more or less than six securement tabs and studs are contemplated for use with the present disclosure.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A deployment flap configured for use with an inflatable cushion and a retainer of an airbag module, comprising:

a foldable material defining the deployment flap;

a plurality of securement tabs being configured to secure the deployment flap to the retainer, each securement tab being secured to the deployment flap and having a weakened area; and a cover area defined in said foldable material, said foldable material being configured for securement about the inflatable cushion such that said foldable material is folded over the inflatable cushion to cover substantially all of the inflatable cushion when it is in a pre-deployment configuration, said securement tabs being configured to secure said foldable material to said retainer and said weakened area being configured to release said foldable material from said retainer upon the inflation of the inflatable cushion, wherein said deployment flap is configured, dimensioned and positioned to bias the inflatable cushion in a selected direction if the deployment flap makes contact with an occupant of the vehicle.

2. The deployment flap as in claim 1, wherein said plurality of securement tabs are cut out of said foldable material such that a portion of said plurality of securement tabs remains secured to said foldable material.

3. The deployment flap as in claim 2, wherein said deployment flap is sewn to the inflatable cushion of the airbag module.

4. The deployment flap as in claim 1, wherein plurality of said securement tabs are secured to said foldable material such that a portion of said plurality of securement tabs remains secured to said foldable material when said foldable material is released from said retainer.

5. The deployment flap as in claim 4, wherein said deployment flap is sewn to the inflatable cushion of the airbag module.

6. The deployment flap as in claim 3, wherein said plurality of securement tabs are plastic.

7. An airbag module adapted for use in a vehicle having an occupant, comprising:

a housing;

an inflator;

an inflatable cushion stored in a folded position in said housing, said inflatable cushion being in fluid communication with said inflator such that upon detection of an activation event said inflator provides a quantity of inflation gas to cause said inflatable cushion to inflate;

a retainer securing the inflatable cushion to the housing;

a deployment flap being secured to a portion of said inflatable cushion, said deployment flap biasing the inflation configuration of the inflatable cushion during a deployment scenario;

a plurality of securement tabs for releasably securing said deployment flap to the retainer;

wherein a cover area of said deployment flap covers said inflatable cushion in a pre-deployment folded position, said securement tabs releasing said deployment flap from said inflatable cushion after a predetermined amount of force is generated by said inflatable cushion, said predetermined amount of force being sufficient to sever said plurality of securement tabs wherein said deployment flap is configured, dimensioned and positioned to bias the inflatable cushion in a selected direction if the deployment flap makes contact with an occupant of the vehicle.

8. The airbag module as in claim 7, wherein said plurality of securement tabs are cut out of said deployment flap such that a portion of said plurality of securement tabs remains secured to said deployment flap.

9. The airbag module as in claim 7, wherein said deployment flap is sewn to the inflatable cushion of the airbag module at a position remote from said plurality of securement tabs.

10. The airbag module as in claim 7, wherein said deployment flap is sewn to the inflatable cushion of the airbag module at a position remote from said plurality of securement tabs and said plurality of securement tabs are secured to said deployment flap such that a portion of said plurality of securement tabs remains secured to said deployment flap when said deployment flap is released from said retainer.

11. The airbag module as in claim 7, wherein said deployment flap has a normal stored position overlying the folded inflatable cushion and deployable toward the occupant by the deploying inflatable cushion, said deployment flap having at least an end wall pleated inwardly to lie on top of the folded inflatable cushion, and a top flap hingedly connected to the end wall and folded to lie on top of the pleated end wall in a closed top position so that initial deployment of the inflatable cushion unpleats the end wall and permits the top flap to shift toward the occupant and then bias initial deployment of the inflatable cushion laterally of the occupant when the top flap is held in the folded position until the eventual unfolding of the top flap permits subsequent unbiased deployment of the inflatable cushion toward the occupant.

12. The airbag module as in claim 7, wherein said deployment flap comprises a flexible foldable material including a rearward wall and a forward wall attached to the airbag module and folded overtop the folded inflatable cushion so that the rearward and forward walls are deployed ahead of the deploying inflatable cushion to define an inflatable cushion deployment chute having a lateral deployment opening opposite an end wall and a top deployment opening which registers with a deployment opening of the airbag module, and said end wall having an extended flap portion extending beyond the dimensional extent of the rearward wall and being folded overtop the folded inflatable cushion in the stored position so that the flap portion closes the top opening of the chute to bias the inflatable cushion deployment through the lateral opening until the flap portion is unfolded to an extended position opening the top opening of the chute to permit further deployment of the inflatable cushion through the top opening.

13. The airbag module as in claim 12, wherein said plurality of securement tabs are cut out of said foldable material such that a portion of said plurality of securement tabs remains secured to said foldable material.

14. The airbag module as in claim 13, wherein said plurality of securement tabs each have an opening configured to receive a stud of said retainer.

15. The airbag module as in claim 14, wherein said deployment flap is sewn to the inflatable cushion of the airbag module.

16. The airbag module as in claim 12, wherein said plurality of securement tabs are plastic members secured to said foldable material, said plurality of securement tabs each have an opening configured to receive a stud of said retainer and said deployment flap is sewn to the inflatable cushion of the airbag module.

17. The airbag module as in claim 16, wherein said deployment flap maintains the inflatable cushion in its folded position when said deployment flap is in its folded position atop the inflatable cushion.

18. An apparatus for selectively modifying the deployment of an inflatable cushion of an airbag module about an occupant of a vehicle, comprising:

a deployment guide member having a normal stored position overlying a folded inflatable cushion and deployable through an opening for a deploying inflatable cushion, said deployment guide member having a confinement shape with an open bottom admitting the deploying inflatable cushion and a forward wall, a rearward wall, and an outboard side wall deployable from the stored position on top of the folded inflatable cushion to a deployed position, said deployment guide further comprising a top flap hingedly connected to the outboard side wall for movement between a closed top position and an open top position, and an open inboard side through which the inflatable cushion obtains initial deployment laterally of the occupant when the top flap is held in the closed top position;

wherein a plurality of securement members are releasably secured to said deployment guide member at one end and a portion of the airbag module at the other.

19. A method of assembling, securing and deploying flap about an inflatable cushion of an airbag module adapted for use in a vehicle, comprising:

folding the inflatable cushion to a desired pre-deployment folded position;

securing a deployment flap to a first portion of the folded inflatable cushion;

securing a retainer to a second portion of the folded inflatable cushion; and securing said deployment flap to said retainer by securing a plurality of releasable securing members to said retainer;

wherein a cover area of said deployment flap covers the inflatable cushion in said desired pre-deployment folded position, and releasing said deployment flap from said retainer upon the inflation of the inflatable cushion, said deployment flap being configured, dimensioned and positioned to bias the inflatable cushion in a selected direction if the deployment flap makes contact with an occupant of the vehicle.

20. The method as in claim 19, wherein said deployment flap has a normal stored position overlying the folded inflatable cushion and deployable toward the occupant by the deploying inflatable cushion, said deployment flap having at least an end wall pleated inwardly to lie on top of the folded inflatable cushion, and a top flap hingedly connected to the end wall and folded to lie on top of the pleated end wall in a closed top position so that initial deployment of the inflatable cushion unpleats the end wall and permits the top flap to shift toward the occupant and then bias initial deployment of the inflatable cushion laterally of the occupant when the top flap is held in the folded position until the eventual unfolding of the top flap permits subsequent unbiased deployment of the inflatable cushion toward the occupant.

* * * * *